Jan. 23, 1968     I. D. GURWICZ     3,365,640
CONTROL MEANS FOR ELECTRICAL APPARATUS
Filed Sept. 25, 1964
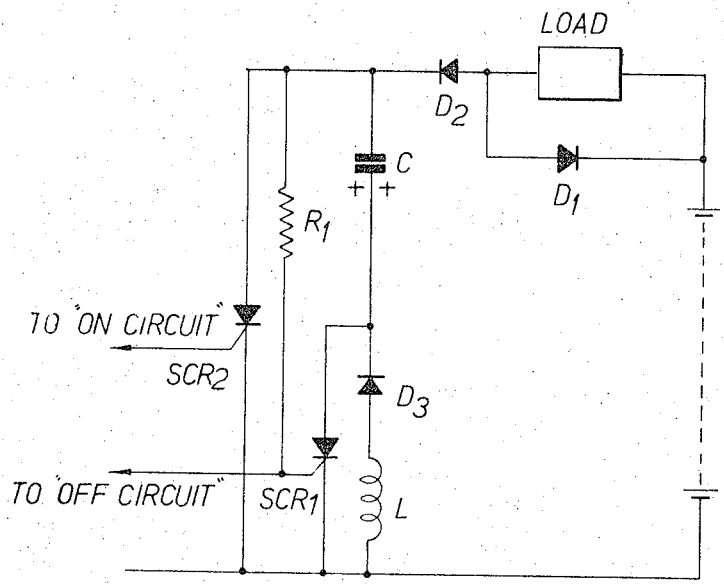
— FIG. 1. —
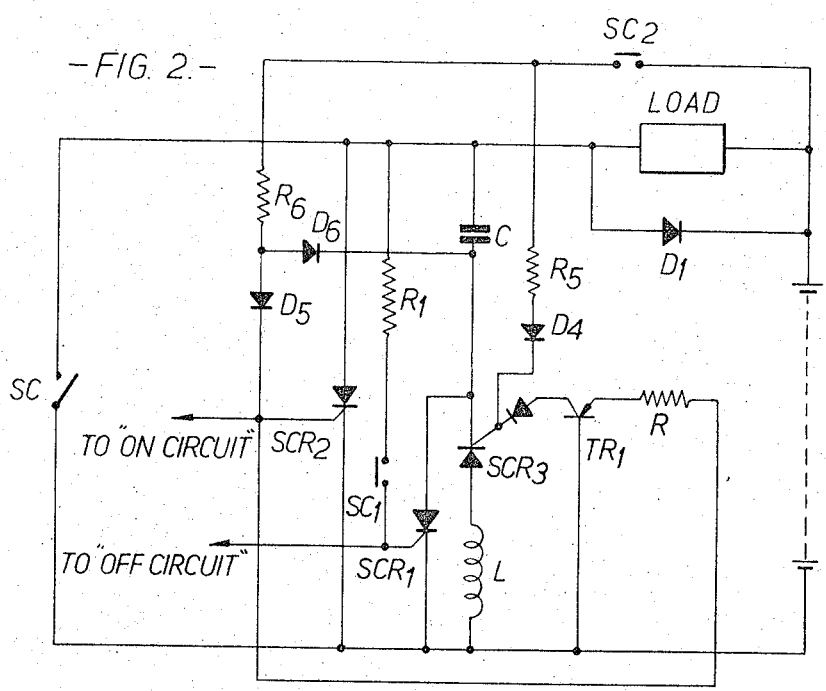
INVENTOR:
Isaac David Gurwicz
BY
R. P. Alten

United States Patent Office 3,365,640
Patented Jan. 23, 1968

3,365,640
CONTROL MEANS FOR ELECTRICAL APPARATUS
Isaac David Gurwicz, Gosforth, Northumberland, England, assignor to Sevcon Engineering Limited, Durham, England
Filed Sept. 25, 1964, Ser. No. 399,198
Claims priority, application Great Britain, Oct. 5, 1963, 39,300/63
5 Claims. (Cl. 318—345)

This invention is for improvements in or relating to control means for electrical apparatus.

The invention is more particularly, although not necessarily exclusively, concerned with improvements in or modifications of the control system forming the subject matter of British Patent No. 950,734. The invention may also be applied to the systems forming the subject matter of British Patent No. 963,647 and 963,648.

In the specification of British Patent No. 950,734, there is described and claimed a control system for a battery operated electric motor or motors comprising a controlled rectifier pulse generator circuit including a capacitor and having means for connecting it between the battery and the motor or motors to be controlled, means for adjusting the pulse frequency and thereby the mean power applied to the motor or motors, means in said circuit for maintaining current flow through the interpulse periods and means in the circuit operative to stop the "inductive effect" of the battery reducing the stored charge in the capacitor and thereby preventing turn-off of the controlled rectifier.

In one preferred arrangement the means for stopping the "inductive effect" of the battery reducing the stored charge in the capacitor and thereby preventing turn-off of the controlled rectifier is a diode connected in series with the motor.

An object of the present invention is to eliminate or reduce the losses or power drop due to the use of a series connected diode but at the same time to retain the increase commutating capacity obtained with the diode.

A particular embodiment of the invention will now be described by way of example and further improvements in or modifications of the systems described in the specification of the aforementioned patent will also be described. In the following description reference is made to the accompanying drawings, in which—

FIG. 1 is a diagram showing a part of the system in the form described in the specification of the aforementioned patents; and FIG. 2 shows improvements according to the present invention.

To commutate an SCR (i.e. switch it off when it has been conducting) the current passing through the SCR must be reduced below a critical value known as the holding current. The SCR does not, however, immediately regain its forward blocking characteristic and a short time must elapse before voltage is re-applied in the forward direction. This recovery time can be reduced by passing reverse current through the SCR on switch off. The length of the recovery period depends on many factors, type of device, temperature of junction prior to switch off, current carried by device just prior to switch off and also the rate of forward voltage rise. The problems of switching off an SCR, therefore, resolve themselves into many facets.

In the circuits (see FIG. 1) used for pulse control of DC traction motors, a capacitor is connected via a controlled rectifier SCR1 across the main current carrying SCR2, this capacitor having a stored charge with polarity as shown in FIG. 1. This stored charge is obtained by first charging the capacitor via the load, diode D2 and SCR1. The capacitor is then discharged inductively via SCR2, the inductor L and diode D3. To ensure that SCR1 is initially in the conducting mode, resistor R1 is included; the presence of R1 also ensures that the capacitors are charged up to the full battery voltage, independent of any transients which may tend to turn off SCR1 once it has been fired by the "off circuit."

The battery voltage under pulse conditions is not a constant on the application of a sudden sharp load through the battery, the battery voltage dips very sharply and may possibly collapse to zero. This period of collapse is only one to two microseconds; the battery voltage then recovers and settles to a value given by the open circuit voltage minus the IR drop within the battery when it is delivering current. On switch off the battery voltage rises sharply and over shoots. This over shoot is due to the inductive nature of the battery connections and some inductive effects due possibly to ion mobility within the battery itself. The amount of over shoot depends on the magnitude of the pulse current delivered by the battery just prior to the switch off of the main SCH2. The effect of this over shoot is that the capacitor C charges via the load D2 and SCR1 to the peak value of this over shoot and in the absence of D2 the capacitor will discharge back through the battery via D1, L and D3 inductively to a value lower than the nominal battery voltage by an amount equal to the over shoot. R1 will then refire SCR1 permitting the capacitor to recharge to the open circuit battery voltage.

The result is that the capacitor is charged always to a value given by the open circuit battery voltage. Since the stored charge on a capacitor is proportional to the voltage across it, any method by which that voltage may be increased would result in increased commutating capacity of the capacitor. In other words to commutate a given current, it would be possible to decrease the amount of capacitance used if the voltage across the capacitor could be increased. The presence of D2 does just this. When the capacitor C is charged to the peak value of the over swing, D2 reverts to its blocking state and does not permit the discharge of the capacitor via D1 and the battery; the result is that with the increasing load current and hence increasing inductive over swing, the stored charge on the capacitor increases and hence the commutating capability of the unit increases.

The system just outlined presents the great advantage of increased commutating capacity with load current but has the drawback that the main load current has to pass through a diode D2. Semi-conductor diodes are not perfect conductors in the forward direction and have on top of their normal ohmic drop a threshold voltage before which they will conduct; in the case of a silicon rectifier, somewhere in the region of 0.6 to 0.7 volt. The result is that due to the voltage drop and the current flowing through the diode, power is dissipated within the component which firstly results in heating of the component and secondly in power wastage.

Turning now to FIG. 2, here the diode D2 is removed and the rectifier D3 of FIG. 1 replaced by a silicon controlled rectifier SCR3. The firing of this auxiliary controlled rectifier SCR3 is accomplished by transistor TR1 via the firing circuit of SCR2.

The method of operation is as follows:

On the switch off the capacitor C, charges via SCR1 to the peak over swing of the battery. It is unable to discharge via D1 and the battery when the battery falls back to its nominal open circuit voltage by the fact that SCR3 is in the blocking mode. The result is that C retains the increased charge; when SCR2 is fired C discharges via SCR2, L and SCR3, SCR3 being fired into the conducting mode by TR1 at the same instant that SCR2 is fired.

Thus the reversal is accomplished as previously, and the presence of SCR3 enables the increased commutating capacity to be attained without the utilisation of a power diode which involves the previously described losses.

The inclusion of this extra silicon controlled rectifier SCR3, whilst it proves beneficial as regards the normal operation of the circuit, causes some difficulty when a shorting contactor SC is closed and released. The purpose of this shorting contactor is to cut-out the pulsing control and allow the motor to be controlled by normal traction motor control gear. It was found that when the shorting contactor SC was energized and shorted out the pulsing controller, it was purely chance if the controller would fail on release of the shorting contactor SC, or revert to the normal pulsing mode.

Consider now the sequences of operation; assuming that just prior to the closure of the shorting contactor SC, capacitor C has been charged to battery voltage i.e. SCR2 is non-conducting. The closure of the shorting contactor SC will result in discharge of capacitor C via the shorting contactor SC, with SCR3 thereby reversing the capacitor charge ready for the next commutation "off" when it occurs. This assumes that the shorting contactor SC does not bounce. If there is any bounce on the shorting contactor, only part of the charge would be transferred via L and SCR3 just before the shorting contactor SC bounces open again. When the shorting contactor SC recloses however, it is impossible to refire SCR3 via the normal triggering circuit from the "on" oscillator. This is because The resultant situation is that SCR3 can no longer be the cathode of SCR3 is now positive with respect to the negative line by a value dependent on the amount of charge that was previously transferred via L and SCR3. triggered into conduction and capacitor C has insufficient charge upon itself to commutate SCR2 when it goes into conduction following the release of the shorting contactor SC. To ensure the firing of SCR3 when the shorting contactor SC is energised necessitates the inclusion of shorting contactor interlock SC2 coupled to close with shorting contactor SC and R5 and D4 as shown in FIG. 2. The full battery potential is applied to the anode of D4 when the shorting contactor interlock SC2 closes; the result is that SCR3 is permanently fed with triggering current until its cathode reaches battery potential, i.e. capacitor C must always acquire a stored charge equal to battery potential.

The conditions thus outlined only occur if the shorting contactor SC closes when capacitor C is charged up to full battery potential and SCR2 is not conducting. If however the shorting contactor SC closes when SCR2 is in the conducting mode, i.e. capacitor C has already reversed its charge via L and SCR3, the precautions previously outlined do not have to be taken. This explains the reason why control failure when the shorting contactor is released, only occurs occasionally.

However, the system as above described was found not to be entirely satisfactory. This was traced to the fact that SCR2 is in the non-conducting mode when the shorting contactor is closed even though it is acquiring triggering current. This is because no actual load current can be arranged to flow through it. Thus, when the shorting contactor SC is released, it is necessary to wait for the turn-on time of SCR2 before the potential across the controller reduces to zero or nearly so. The turn-on time of an SCR is in the order of one or two microseconds, thus there is sufficient voltage available to fire SCR1 via R1 during the turn on time of SCR2; this results in the simultaneous firing of SCR1 and SCR2 and hence failure of the controller. To eliminate this an interlock SC1 is connected in series with R1, and is broken when the shorting contactor SC is energised and only remakes after the shorting contactor SC has fully opened. This gives sufficient time for the main silicon controlled rectifier SCR2 fully to conduct and therefore remove any voltage across the controller.

A further problem, however, presents itself with the arrangement shown in FIG. 2 for ensuring that SCR2 is in the conducting mode by making the "on" oscillator fire repeatedly. Since, as previously mentioned, the removal of D2 causes an inability to maintain SCR2 in conduction, therefore when the shorting contactor SC breaks, SCR2 has to wait the next triggering pulse from the oscillator to go into conduction. This can result in arcing at the shorting contactor SC tips and since one of the prime advantages of semi-conductor control is the removal of frequent contactor service requirements, this is a great disadvantage. The circuit shown in FIG. 2 ensures that SCR2 is in permanent conduction, i.e. a permanent D.C. voltage is applied to the trigger of SCR2 when the shorting contactor SC is energised. This is quite easily arranged by causing the shorting contactor interlock SC2 to provide a constant D.C. potential at the trigger of SCR2. This however, does not provide the ultimate solution. The reason for this is that the shorting contactor SC may close just after a signal has been fired from the oscillator to the "off" SCR1. Since SCR2 is switched immediately into conduction by this D.C. potential applied by the shorting contactor interlock SC2, this would prevent the recharging of the capacitor C. The result would be a delay for the time constant R5C, before the charging of the capacitor in the reverse direction. To prevent excessive losses R5 has to be fairly large and it would therefore be possible for the shorting contactor SC to be released before the completion of this reverse charge and hence drop out of the controller. The problem thus resolves itself to ensuring that SCR2 is not fired if SCR1 is in the conducting mode, i.e. capacitor C is not fully charged. This is accomplished by the insertion of D6. The action of the clipping circuit made up by R6, D5 and D6 is such that SCR2 is not fired until a positive charge is built up on the cathode of SCR3, i.e. until the capacitor C is charged in the correct direction for commutation. The sequence is then as desired.

Whenever the shorting contactor SC is closed a reverse charge must appear on capacitor C, independent of any bounce of the contactor. When this reverse charge is obtained SCR2 is permanently triggered "on" and thus the breaking of the shorting contactor SC will not cause any arcing.

I claim:
1. A control system for a battery operated electric motor comprising:
   a first controlled rectifier connected in series with a capacitor between a terminal of the motor and the battery,
   a second controlled rectifier connected in parallel with said first rectifier and capacitor, and
   a third controlled rectifier connected in series with an inductor across said first rectifier;
   an "off" pulse circuit connected to the firing terminal of said first rectifier, and
   "on" pulse circuit connected to the firing terminals of said second and third rectifiers.

2. A control system as in claim 1, in which all of said controlled rectifiers are of the silicon type.

3. A control system as in claim 1 in which the connection to the firing terminal of said third controlled rectifier includes a transistor amplifier.

4. A control system as in claim 1 further comprising means for short-circuiting the controlled rectifier circuit, the said means comprising:
   first, second and third contactors, said first contactor being connected across said second controlled rectifier, said second contactor establishing connections to said "on" pulsing circuit and to the firing electrode contact of said third controlled rectifier from the positive terminal of the battery, and said third contactor connecting the firing electrode terminal of said first controlled rectifier via a resistor to a terminal of the motor, said first and second contactors being operable for making contact at substantially the same time said third contactor is breaking contact.

5. A control system for a motor operated on direct current by means of pulses of current comprising:
  a first controlled rectifier for producing the current pulses,
  a capacitor circuit including a second controlled rectifier for extinguishing said first controlled rectifier at the end of each pulse,
  means connecting said first and second controlled rectifiers "on" and "off" pulsing circuits, and
  a third controlled rectifier in series with said capacitor, the firing electrode terminal of which is connected to the firing terminal of said first controlled rectifier via a rectifier.

References Cited

UNITED STATES PATENTS

| | | | |
|---|---|---|---|
| 3,191,112 | 6/1965 | Cain | 318—345 X |
| 3,195,029 | 7/1965 | Gilbreath | 318—345 X |
| 3,222,585 | 12/1965 | Lobb | 318—345 X |

ORIS L. RADER, *Primary Examiner.*

J. J. BAKER, *Assistant Examiner.*